United States Patent
Diamond et al.

(10) Patent No.: US 11,959,758 B2
(45) Date of Patent: Apr. 16, 2024

(54) SYSTEMS AND METHODS FOR OPTIMIZING VEHICLE DEPLOYMENT

(71) Applicant: Ford Global Technologies, LLC, Dearborn, MI (US)

(72) Inventors: Brendan Diamond, Grosse Pointe, MI (US); Erik J. Christen, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 17/062,792

(22) Filed: Oct. 5, 2020

(65) Prior Publication Data
US 2022/0107191 A1    Apr. 7, 2022

(51) Int. Cl.
*G01C 21/34* (2006.01)
*G01C 21/36* (2006.01)

(52) U.S. Cl.
CPC ..... *G01C 21/3469* (2013.01); *G01C 21/3461* (2013.01); *G01C 21/3691* (2013.01)

(58) Field of Classification Search
CPC ............ G01C 21/3469; G01C 21/3461; G01C 21/3691; G08G 1/202; G05D 1/0297; B60L 2260/52; B60L 2260/54
See application file for complete search history.

(56) References Cited

U.S. PATENT DOCUMENTS

| | | | |
|---|---|---|---|
| 5,815,824 A * | 9/1998 | Saga | B60W 20/00 180/65.245 |
| 6,181,991 B1 * | 1/2001 | Kondo | G07F 15/04 701/1 |

(Continued)

FOREIGN PATENT DOCUMENTS

| | | | | |
|---|---|---|---|---|
| CN | 104809549 A | | 7/2015 | |
| DE | 102012011501 A1 * | | 12/2013 | ....... G08G 1/096844 |

(Continued)

OTHER PUBLICATIONS

Blaschke Volker, DE102019204142 Method and system for optimizing the wear of the vehicles of a vehicle fleet, 2020 (Year: 2020).*

Khanafer Ali, DE102012011501 Method of operating a motor vehicle, 2013 (Year: 2013).*

(Continued)

*Primary Examiner* — David A Testardi
(74) *Attorney, Agent, or Firm* — Brandon Hicks; Eversheds Sutherland (US) LLP

(57) ABSTRACT

The disclosure is generally directed to systems and methods for optimizing vehicle deployment. A software application is used to obtain information about a travel route. The information is used to evaluate an energy storage depletion characteristic of a battery that is used to operate a battery-operated vehicle and to determine whether the battery-operated vehicle can be deployed on the travel route. One of the factors that can affect the energy storage depletion characteristic of the battery is ambient temperature, because battery performance may be adversely affected by extreme temperatures. Consequently, a range of operation of the battery-operated vehicle may be impacted if the travel route has extreme ambient temperatures. If the evaluation indicates that the energy storage depletion characteristic of the battery is unsuitable for the travel route, another battery-operated vehicle with a better battery may be deployed on the travel route.

4 Claims, 4 Drawing Sheets

(56) References Cited

U.S. PATENT DOCUMENTS

| | | | |
|---|---|---|---|
| 6,625,539 B1* | 9/2003 | Kittell | G08G 1/202 701/32.4 |
| 6,850,898 B1* | 2/2005 | Murakami | B60L 53/305 705/13 |
| 6,975,997 B1* | 12/2005 | Murakami | G06Q 10/08 705/5 |
| 8,290,701 B2 | 10/2012 | Mason et al. | |
| 9,958,272 B2 | 5/2018 | Morris, IV et al. | |
| 11,447,024 B1* | 9/2022 | Brannan | B60L 53/62 |
| 2002/0096886 A1* | 7/2002 | Schmitz | B60K 6/46 290/40 C |
| 2012/0185118 A1 | 7/2012 | Tate, Jr. | |
| 2012/0290149 A1* | 11/2012 | Kristinsson | B60W 10/08 701/2 |
| 2013/0179067 A1 | 7/2013 | Trowbridge et al. | |
| 2014/0074329 A1* | 3/2014 | Yang | B60L 58/12 903/930 |
| 2014/0229095 A1* | 8/2014 | Klimesch | B60R 16/0236 701/123 |
| 2015/0006002 A1* | 1/2015 | Yamane | G06Q 50/30 701/22 |
| 2015/0039215 A1* | 2/2015 | Wu | G01C 21/3415 701/123 |
| 2016/0061610 A1* | 3/2016 | Meyer | B60L 58/12 701/22 |
| 2016/0297318 A1* | 10/2016 | Kirimoto | B60L 58/13 |
| 2016/0368396 A1* | 12/2016 | Konet | B60L 15/2045 |
| 2017/0030728 A1* | 2/2017 | Baglino | G01C 21/3697 |
| 2017/0074677 A1* | 3/2017 | MacNeille | G01C 21/3469 |
| 2017/0174204 A1* | 6/2017 | Jones | B60W 10/06 |
| 2017/0282738 A1* | 10/2017 | Miller | B60L 1/02 |
| 2018/0032920 A1* | 2/2018 | Ito | G06Q 10/02 |
| 2018/0060776 A1* | 3/2018 | Ahmed | G07C 5/0808 |
| 2018/0170349 A1* | 6/2018 | Jobson | B60L 7/18 |
| 2020/0074372 A1* | 3/2020 | Whaling | G06Q 30/0206 |
| 2020/0111175 A1* | 4/2020 | Uyeki | B60L 53/67 |
| 2020/0198782 A1* | 6/2020 | Li | G08G 1/202 |
| 2020/0207235 A1* | 7/2020 | Ozawa | G08G 1/205 |
| 2020/0265720 A1* | 8/2020 | Uehara | H04W 4/021 |
| 2021/0080946 A1* | 3/2021 | Villa | B64C 39/024 |
| 2021/0104160 A1* | 4/2021 | Gao | G06Q 10/02 |
| 2021/0109524 A1* | 4/2021 | Goldman | G05D 1/0088 |
| 2021/0125499 A1* | 4/2021 | Cooper | G06Q 30/0645 |
| 2021/0155221 A1* | 5/2021 | Gottehrer | B60W 20/40 |
| 2021/0339650 A1* | 11/2021 | Hashimoto | B60L 15/20 |
| 2021/0389145 A1* | 12/2021 | Liu | B60W 10/26 |
| 2022/0081010 A1* | 3/2022 | Urano | G08G 1/0129 |
| 2022/0108248 A1* | 4/2022 | Oobayashi | B60R 16/0231 |
| 2022/0242272 A1* | 8/2022 | Okamoto | B60L 3/0046 |
| 2022/0252415 A1* | 8/2022 | Meroux | G01C 21/3492 |
| 2022/0390244 A1* | 12/2022 | Ho | G06Q 10/063 |

FOREIGN PATENT DOCUMENTS

| | | | | |
|---|---|---|---|---|
| DE | 102014204308 A1 | * | 9/2015 | ............ B60L 1/003 |
| DE | 102019204142 A1 | * | 10/2020 | |
| EP | 3501881 A1 | * | 6/2019 | ............ B60L 50/60 |
| GB | 2539422 A | * | 12/2016 | ........ G06Q 10/0631 |
| WO | WO-2013174423 A1 | * | 11/2013 | ........ B60L 11/1861 |

OTHER PUBLICATIONS

Bechler Marc, DE102014204308 Range estimation for electric vehicles, 2015 (Year: 2015).*

Dammak, Najeh et al., "A Review of Optimal Routing Problem for Electric Vehicle", 2019 International Colloquium on Logistics and Supply Chain Management (LOGISTIQUA) Date of Conference: Jun. 12-14, 2019, 5 pages (Year: 2019).*

* cited by examiner

SYSTEMS AND METHODS FOR OPTIMIZING VEHICLE DEPLOYMENT

FIELD OF THE DISCLOSURE

This disclosure generally relates to vehicles and more particularly to optimizing the deployment of vehicles on travel routes.

BACKGROUND

Delivery services such as the United States Postal Service (USPS), FedEx®, UPS®, and Amazon® typically put in significant effort to optimize delivery routes in order to save money on variables such as fuel cost, personnel costs, and delivery efficiency. The criteria used to do so may vary from one delivery service to another due to various factors. For example, the USPS delivers letters and small packages to a large number of customers who live relatively close to each other, such as along a city street in an urban area or in a subdivision in a suburban area. The type of vehicle that is used to make these deliveries is typically a compact van that runs on gasoline or diesel and makes numerous stops when moving from house to house in a neighborhood. Optimizing a delivery route for a USPS van may involve charting a continuous path inside a neighborhood based on a geographical layout of the neighborhood. The continuous path remains relatively unchanged over several years.

On the other hand, delivery services such as Amazon® or FedEx® deliver packages to addresses that may not necessarily be located next to each other and can be geographically distributed over a larger area than a neighborhood or a city block. The type of vehicle that is used to make these deliveries is typically a medium or large size truck that can hold larger packages rather than just letters and runs on gasoline or diesel. Optimizing a delivery route for an Amazon® or FedEx® truck may involve charting a complex path that can vary on a daily basis. In some cases, more than one vehicle may be assigned to a delivery area if the number of deliveries increases such as during Christmas or other holidays. The logistics involved in determining delivery routes for such vehicles can be complex, and the number of variables that have to be taken into consideration can vary over time.

A need therefore exists to provide cost savings solutions for optimizing delivery routes that take into consideration factors such as travel routes, evolving business models (USPS cooperating with Amazon®, for example), and technology changes (such as the introduction of electric vehicles and hybrid-electric vehicles).

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
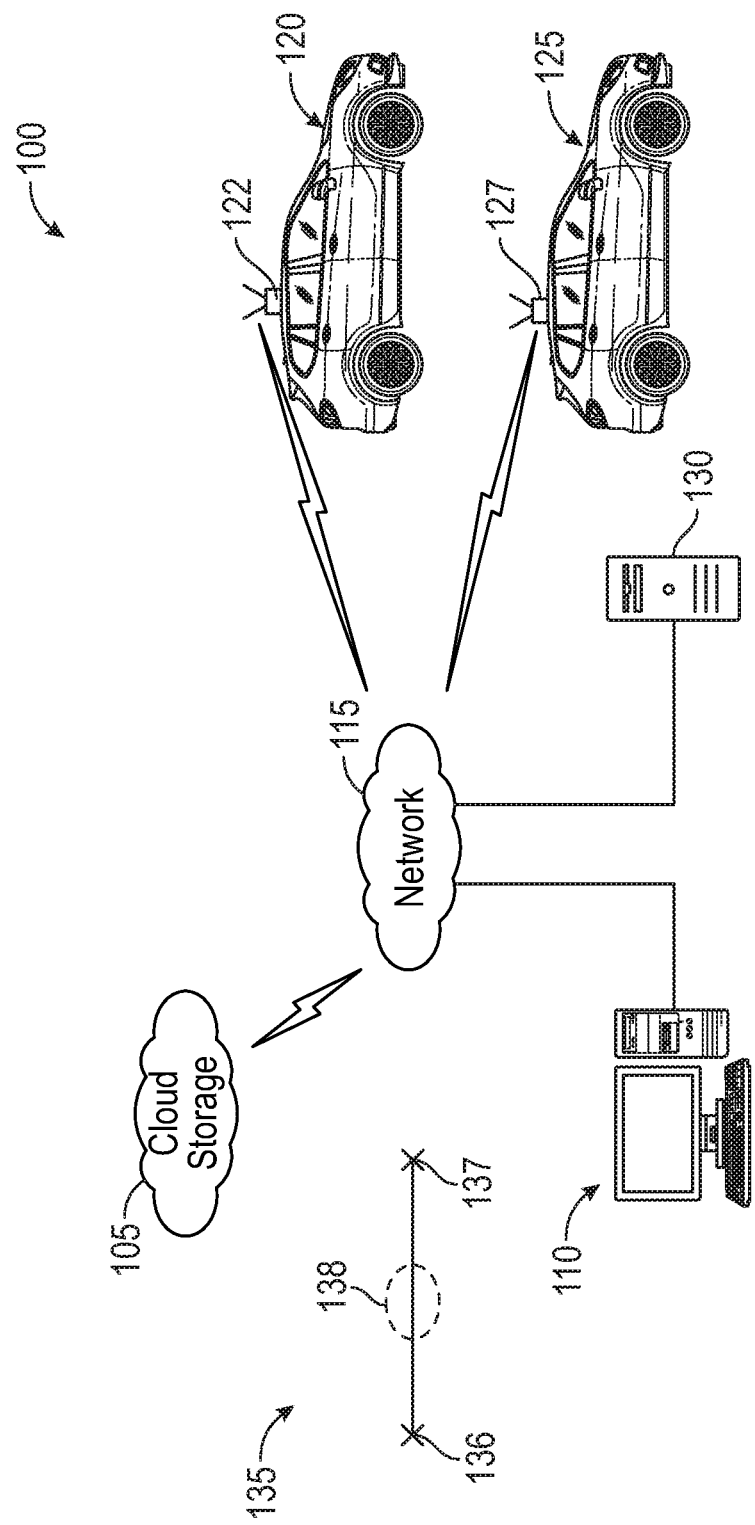
FIG. 1 illustrates an example system for optimizing vehicle deployment in accordance with an embodiment of the disclosure.

In terms of a general overview, certain embodiments described in this disclosure are directed to systems and methods for optimizing vehicle deployment. In one example embodiment, a software application provided in a computer is used to obtain information about a travel route. The information may be used to determine whether a battery-operated vehicle, such as an electric vehicle or a hybrid-electric vehicle, can be deployed on the travel route. More particularly, the information may be used to evaluate an energy storage depletion characteristic of a battery that is used to operate the battery-operated vehicle. One of the factors that can affect the energy storage depletion characteristic of the battery is ambient temperature, because battery performance may be adversely affected by extreme temperatures. Consequently, a range of operation of the battery-operated vehicle may be impacted if the travel route has extreme ambient temperatures. If the evaluation indicates that the energy storage depletion characteristic of the battery is unsuitable for the travel route, another battery-operated vehicle with a better battery may be deployed on the travel route.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular component such as a first processor in a first computer may be performed by another component such as a second processor in another computer. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. More particularly, phrases such as "electric vehicle" or "battery-operated vehicle" as used herein can refer to any type of vehicle that uses a battery to energize a motor for moving the vehicle. Such vehicles may be referred to in popular lingo by a variety of labels, such as, for example, an all-electric vehicle, a battery electric vehicle (BEV), a hybrid electric vehicle, a plug-in hybrid electric vehicle (PHEV), and a full hybrid electric vehicle (FHEV). Hybrid vehicles typically include a motor that runs on a battery and an engine that runs on gasoline or diesel. It should be understood that the phrase "energy storage depletion characteristic" as used herein with reference to a battery generally refers to a performance characteristic of a battery, or in simplistic terms, provides a way to distinguish between a "good" charge holding battery and a "leaky" battery. It should also be understood that the word "example" as used herein is intended to be non-exclusionary and non-limiting in nature.

FIG. 1 illustrates an example system 100 for optimizing vehicle deployment in accordance with an embodiment of the disclosure. In this example setup, a computer 110 is configured to execute a software program that performs actions associated with deploying one or more vehicles on one or more travel routes. The computer 110 is communicatively coupled via a network 115 to various elements such as a server computer 130 and cloud storage 105. The network 115 may include any one or a combination of various networks such as a cellular network, a telephone network, a cable network, a wireless network, and/or private/public networks such as the Internet. The server computer 130 may be communicatively coupled to the network 115 wirelessly or via a wired medium. Cloud storage 105 can include multiple memory systems and data storage devices arranged to allow storage of various types of data and information.

A software application provided in the computer 110 may be executed to evaluate deployment of vehicles on a travel route 135. As a part of the evaluation, the computer 110 obtains various types of information about the travel route 135 and about one or more vehicles, particularly battery-operated vehicles. The information, which can be obtained from cloud storage 105 or other sources, may include items such as weather conditions and driving conditions on the travel route 135 and information pertaining to a battery of a battery-operated vehicle. Information pertaining to a battery may include parameters such as, for example, battery capacity (amp-hour rating), date when placed in service, historical performance data, and mean time between failures (MTBF). Information about batteries and various battery-operated vehicles can be evaluated by the computer 110 to determine whether a first battery-operated vehicle (for example, a battery-operated vehicle 120) having a first battery would be suitable for deployment on the travel route 135.

The battery-operated vehicle 120 can be one of several vehicles that belong, for example, to a fleet of rental cars operated by a rental company such as Hertz®; a fleet of taxis operated by a taxi service operator; or a fleet of cars operated by a ride-hail service such as Uber® or Lyft®. If the software application determines that the battery-operated vehicle 120 is suitable for deployment on the travel route 135, the computer 110 may issue a deployment command (and instructions) that propagate through the network 115 to a wireless transponder 122 provided in the battery-operated vehicle 120.

If the software application determines that the battery-operated vehicle 120 is unsuitable or sub-optimal for deployment on the travel route 135, a further evaluation may be carried out to determine if a second battery-operated vehicle (for example, a battery-operated vehicle 125) can be deployed instead. If found suitable, the computer 110 may issue a deployment command (and instructions) that propagates through the network 115 to a wireless transponder 127 provided in the battery-operated vehicle 125. This procedure may be repeated further if the second battery-operated vehicle is also found unsuitable or sub-optimal for deployment on the travel route 135.

As a part of an evaluation procedure to determine if the battery-operated vehicle 120 is suitable for deployment on the travel route 135, the computer 110 may process information obtained from the cloud storage 105 such as for example, battery data about a battery that is used to operate a motor in the battery-operated vehicle 120, in order to evaluate an energy storage depletion characteristic of the battery. One of the factors that can affect the energy storage depletion characteristic of the battery is an ambient temperature, because battery performance can be adversely affected by extreme temperatures. Consequently, a range of operation of the battery-operated vehicle 120 may be impacted if the travel route 135 has extreme ambient temperatures.

For example, the travel route 135, which extends from an originating location 136 to a destination location 137, may include a section 138 having sub-zero ambient temperatures that would significantly affect the performance of the battery in the battery-operated vehicle 120. In one example case, the battery-operated vehicle 120 is a sedan having a low amp-hour battery that has been in service for a long period of time and is approaching end of life. The battery may be adequate to drive a motor of the sedan when the weather is sunny, but may be unable to do so in cold weather. The energy storage depletion characteristic of the battery is therefore unsuitable for the travel route 135, and the software application may evaluate another battery-operated vehicle such as the battery-operated vehicle 125, to determine if the battery-operated vehicle 125 is more suitable for deployment on the travel route 135.

If the battery-operated vehicle 125 is found suitable for deployment, the computer 110 may issue a deployment command (and instructions) that is propagated through the network 115 to a wireless transponder 127 provided in the battery-operated vehicle 125. Various other factors in addition to, or in lieu of, the energy storage depletion characteristic of the battery of the battery-operated vehicle 120 and/or the battery of the battery-operated vehicle 125 may be used to evaluate suitability for deployment on the travel route 135. Some of these factors are described below in more detail.

Figure 2:
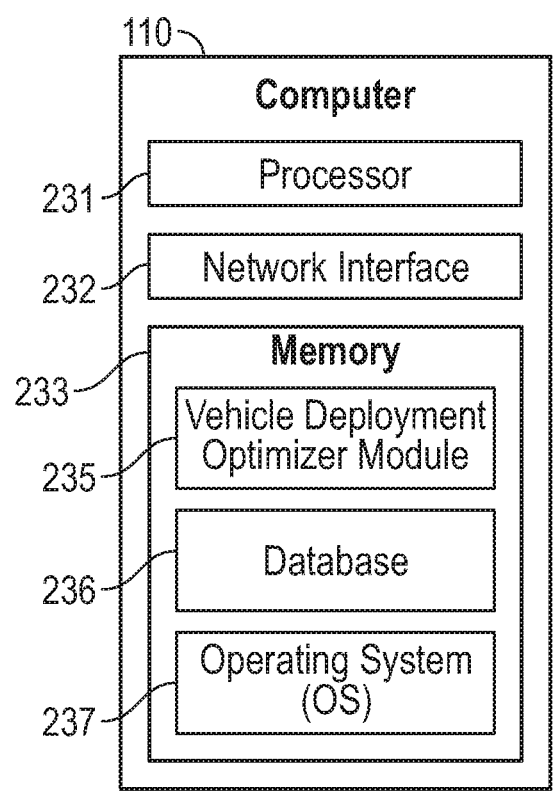
FIG. 2 illustrates some example components that may be included in a computer configured to optimize vehicle deployment in accordance with the disclosure.

FIG. 2 illustrates some example components that may be included in a computer 110 configured to optimize vehicle deployment in accordance with the disclosure. The example components can include a processor 231, a network interface 232, and a memory 233. The network interface 232 can include various wired and/or wireless circuitry that communicatively couple the computer 110 to the network 115. The memory 233, which is one example of a non-transitory computer-readable medium, may be used to store an operating system (OS) 237, a database 236, and various code modules such as a vehicle deployment optimizer module 235. The code modules are provided in the form of computer-executable instructions that can be executed by the processor 231 for performing various operations in accordance with the disclosure.

The vehicle deployment optimizer module 235 may be executed by the processor 231 for performing procedures to optimize deployment of one or more vehicles along one or more travel routes. The procedure can involve route planning and vehicle selection operations based on consideration of factors such as, for example, an energy storage depletion characteristic of a battery and/or ambient temperature conditions along a travel route. Other factors that may be used in addition to, or in lieu of, the energy storage depletion characteristic of a battery and/or ambient temperature conditions, are disclosed below. The database 236 and/or cloud storage 105 may be used to store information pertaining to such factors. The server computer 130 may be configured to provide assistance to the computer 110 for obtaining this information.

A first factor among the various factors that may be used to optimize vehicle deployment in accordance with the disclosure is a range of operation of a vehicle, particularly a battery-operated vehicle. The vehicle may be, for example, the battery-operated vehicle 120 or the battery-operated vehicle 125. The range of operation of a vehicle may be generally determined by metrics such as a state of charge (SOC) of a battery of the battery-operated vehicle, a health of the battery, a fuel capacity of the vehicle (if the vehicle is a hybrid-electric vehicle), environmental conditions, travel route metrics, and vehicle details. Travel route metrics and vehicle characteristics can include items such as grades on roads that are a part of a travel route, elevation, speed limit, coefficient of drag, rolling resistance, drive train, and aerodynamics. Such travel route metrics and vehicle characteristics can impact the energy storage depletion characteristic of a battery when used to move the vehicle.

A second factor among the various factors that may be used to optimize vehicle deployment in accordance with the disclosure is a capacity of a vehicle, and more particularly, the weight of a vehicle. The weight of a vehicle, which is typically expressed in terms such as a gross combined weight rating (GCWR) or a gross vehicle weight rating (GVWR), can adversely impact the energy storage depletion characteristic of a battery when used to move the vehicle.

A third factor among the various factors that may be used to optimize vehicle deployment in accordance with the disclosure is a trip cost and/or a vehicle cost. Such costs may be generally defined under various categories such as, for example, maintenance cost, future overhaul cost, refueling cost, battery charging cost, driver cost, variable and fixed vehicle investment cost. Maintenance cost, which can be referred to in terms of maintenance cost per mile based on a type of vehicle, may be determined for sources such as a fleet repair database, historical data, mileage ratings, OEM testing, labor cost, and repair cost. Labor cost and/or repair cost may involve regular maintenance items such as brakes, fluids, and tires, and can also include parts that have either failed or been damaged. Future overhaul cost refers to anticipated overhauls, particularly to major vehicle components such as a gasoline engine, a diesel engine, an electric motor, and transmission system. Refueling cost may pertain to cost of filling fuel (gasoline or diesel, when the vehicle is a hybrid electric vehicle) and battery charging cost (when the vehicle is a battery-operated vehicle). Battery charging costs may vary between various travel routes. Driver cost may include items such as salary, hourly rate, contracted rate, contracted amount and overtime, some of which may be calculated on a per-trip basis based on route, time, and availability, for example. Variable and fixed vehicle investment cost may include items such as purchase price, depreciation cost, maintenance costs, taxes, fees, and annual registration.

A fourth factor among the various factors that may be used to optimize vehicle deployment in accordance with the disclosure is risk adjusted payment. The risk adjusted payment may be paid to a transportation company owning the battery-operated vehicles for delivering goods on time. The amount may be adjusted in some cases due to tardiness of delivery or damage to goods during transit.

Figure 3:
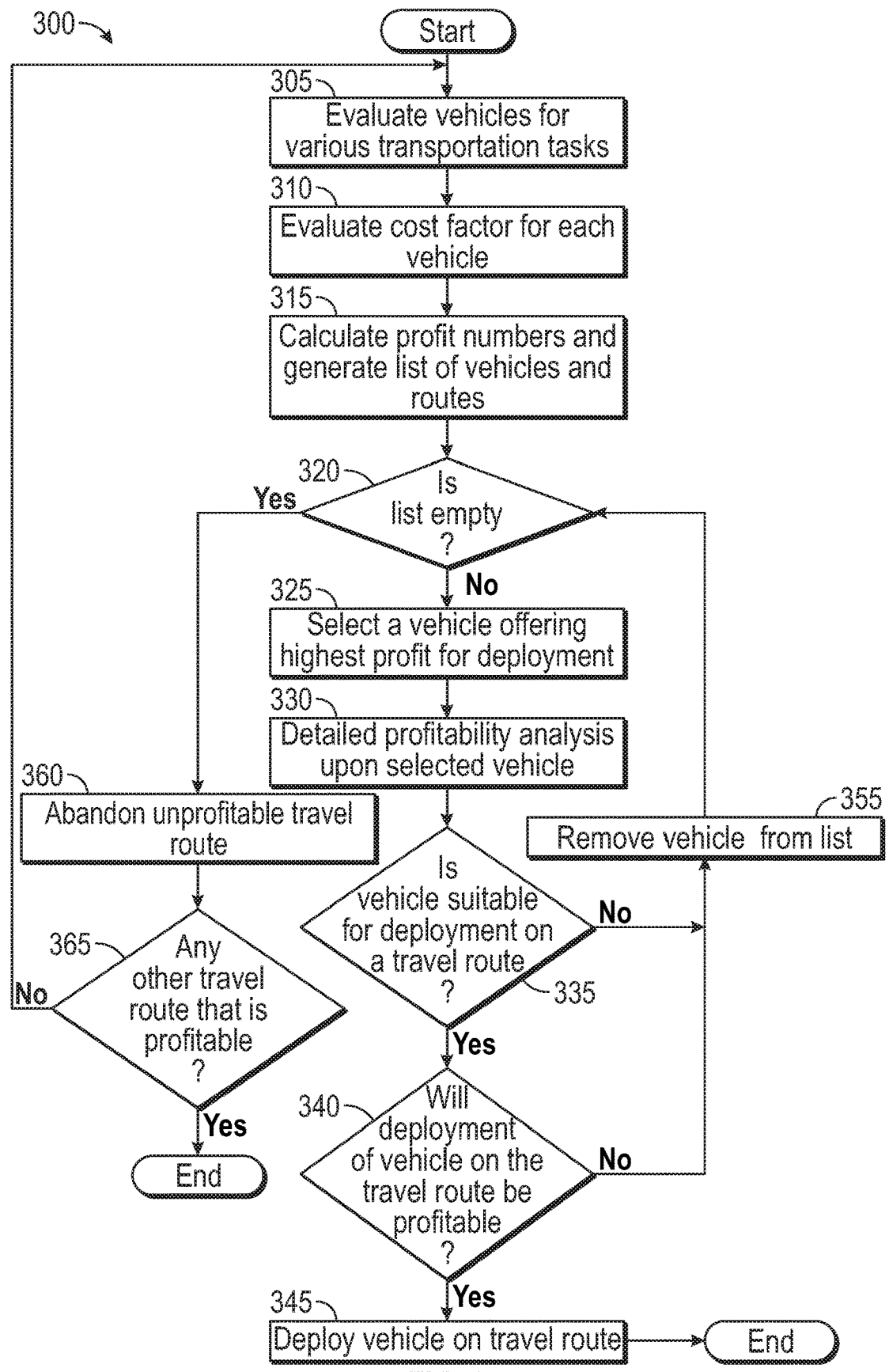
FIG. 3 shows a flowchart of an example method to optimize vehicle deployment in accordance with an embodiment of the disclosure.

FIG. 3 shows a flowchart 300 of an example method to optimize vehicle deployment in accordance with an embodiment of the disclosure. The flowchart 300 illustrates a sequence of operations that can be implemented in hardware, software, or a combination thereof. In the context of software, the operations represent computer-executable instructions stored on one or more non-transitory computer-readable media such as the memory 233, that, when executed by one or more processors such as the processor 231, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flowchart 300 may be carried out by executing the vehicle deployment optimizer module 235. The description below may make reference to certain objects shown in FIG. 1 and FIG. 2, but it should be understood that this is done for purposes of explaining certain aspects of the disclosure and that the description is equally applicable to many other embodiments where various other types of components and vehicles may be involved.

At block 305, an entity such as a fleet operator (for example. Uber®, Lyft®, or Hertz®) or a trucking company (for example. Swift Corporation®, Schneider International®, or J.B. Hunt®) evaluates various transportation tasks associated with its customers and identifies time periods and travel routes associated with fulfilling the transportation tasks. The entity also identifies fleet vehicles that are available for executing the transportation tasks. Various particulars associated with the available vehicles (type of vehicle, capacity of vehicle, driver information, operating costs, maintenance costs, etc.) are uploaded into a server computer, such as the server computer 130 shown in FIG. 1.

At block 310, each of the vehicles may be evaluated to identify a cost factor associated with operations related to the transportation tasks. A cost factor for each vehicle can be determined for a single travel route in some cases and multiple travel routes in some other cases. The multiple travel routes may be sequential in nature with stopovers in some cases. For example, the cost factor associated with an 18-wheeler delivery truck may be evaluated for fulfilling a delivery at a first town, followed by delivery at a second town, and so on. One or more stopovers may be provided for various reasons such as for picking up a new load at the second town.

At block 315, profit numbers based on projected revenue earnings may be calculated for operating the various vehicles on one or more travel routes. A list of travel routes and vehicles that satisfy projected revenue earnings for deployment on the travel routes can be generated. In some cases, the profit numbers and/or projected revenue earnings may not justify deploying a vehicle on a particular travel route. Accordingly, no vehicle is assigned to the travel route and the travel route is excluded from the list.

At block 320, a determination is made whether the list is empty. If the list is empty, at block 360, the travel route that was deemed unprofitable is abandoned. At block 365 a determination is made whether other travel routes are available for consideration. If no other travel routes are available for consideration, further actions are terminated. If one or more travel routes are present in the list, the actions associated with block 305 and subsequent blocks are performed.

If, at block 320, the list is not empty, at block 325, a vehicle that offers the highest profit among all vehicles for deployment on a travel route is selected. At block 330, a detailed profitability analysis is carried out upon the selected vehicle. More particularly, various actions may be carried out as a part of the detailed profitability analysis when the selected vehicle is a battery-operated vehicle (an electric vehicle or a hybrid electric vehicle, for example).

Some of these actions can include optimizing when and where to charge a battery of the vehicle when the vehicle is deployed on the travel route. When to charge the battery may be driven by various factors such as, for example, timing constraints and cost constraints. One example of a timing constraint can come into play when a vehicle is running behind schedule and a cost penalty incurred if a delivery is delayed at the destination. Another example of a timing constraint may be a trade-off between reaching a destination at a certain time and depleting a battery (state of charge) to an unacceptable level. Yet another example of a timing constraint may be an amount of time involved in charging a battery after reaching an intermediate destination and heading out to another destination, thereby incurring overtime pay or a driver of the vehicle.

Cost constraints associated with charging the battery of the vehicle can include variation in prices between various charging stations on the travel route and costs associated with downtime while the battery is being charged. The state of charge of the battery can not only affect where and when the battery is charged but may also affect the performance of the battery. For example, some batteries are more efficient when the state of charge is depleted to a very low level whereas in some other cases, a level of the state of charge may be irrelevant.

When to charge a battery of a vehicle may be driven not only by a state of charge of a battery but by various factors such as the energy depletion characteristic of the battery, weight and hauling capacity of the vehicle, an operational condition of the vehicle (maintenance and reliability, for example), driver alertness (drowsy driver needing a rest stop, for example).

Upon completion of the profitability analysis, at block 335, a determination is made regarding schedules for the vehicle. For example, a determination may be made whether the vehicle may be used to complete an assignment on time by traveling on a first travel route and then be prepared for travel on a second travel route in a timely manner. Various factors come into play such as for example, vehicle capabilities (horse power, speed, hauling capacity etc.) and driver capabilities (driving experience, driving record, availability, etc.). If the vehicle is found unsuitable based on the scheduling requirements, at block 355, the vehicle is removed from the list that has been described above. This action is followed by actions associated with block 320 and subsequent blocks.

If the vehicle is found suitable based on the scheduling requirements, at block 340, a further determination is made regarding profitability of deploying the vehicle on one or more specific travel routes. If deployment of the vehicle is deemed unprofitable, the actions associated with block 355, block 320 and subsequent blocks are executed. If deployment of the vehicle is deemed profitable, at block 345, the vehicle is deployed on a travel route. The flowchart 300 may be re-executed if the vehicle has to be deployed on additional travel routes and/or if a different vehicle has to be deployed on the travel route.

Figure 4:
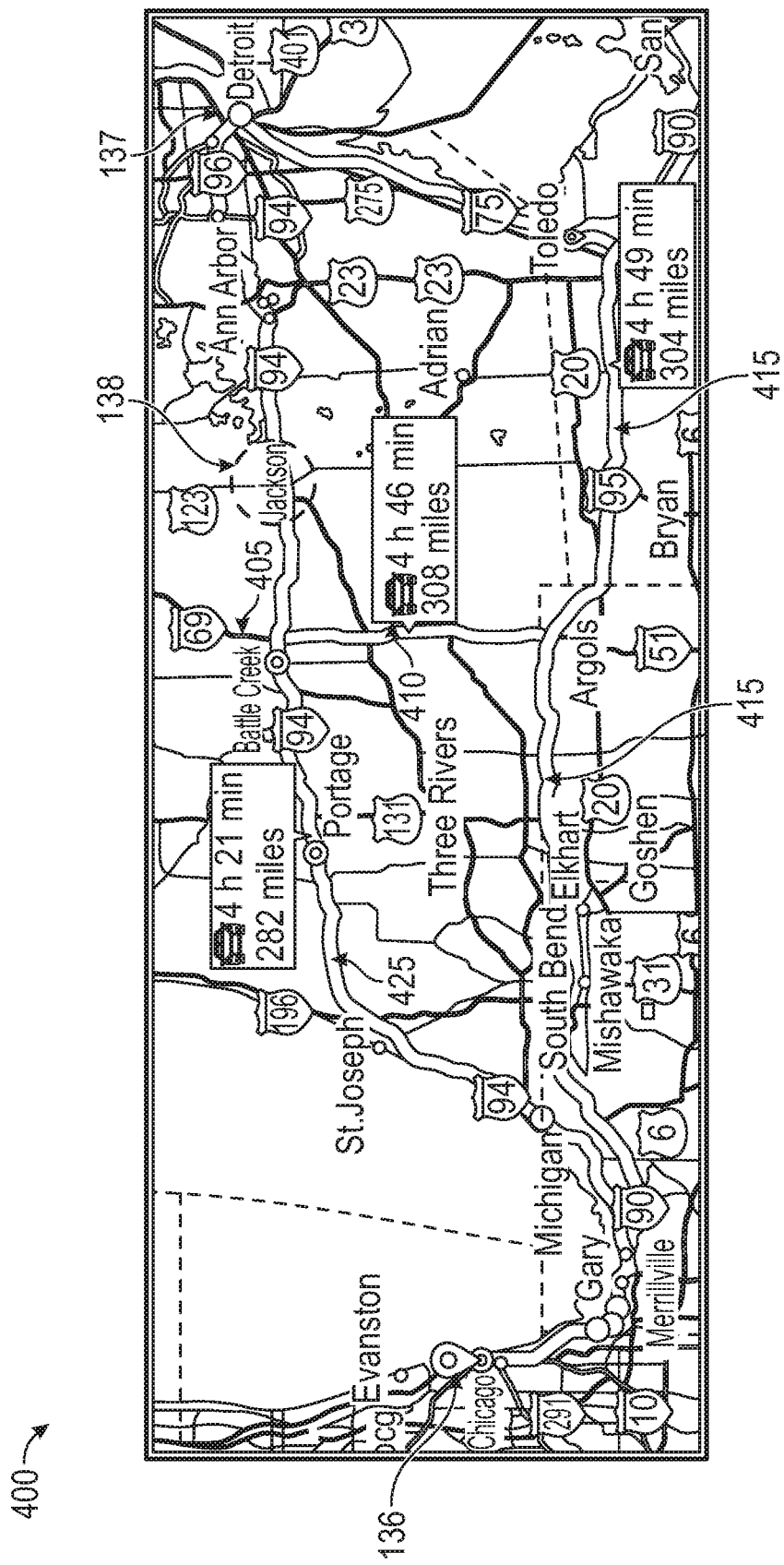
FIG. 4 shows a travel route map to illustrate an example method for optimizing vehicle deployment in accordance with an embodiment of the disclosure.

FIG. 4 shows a travel route map 400 to illustrate an example method for optimizing vehicle deployment in accordance with an embodiment of the disclosure. The originating location 136 (shown in FIG. 1 as well) in this example scenario is Chicago and the destination location 137 is Detroit. A vehicle may be deployed on one of two different travel routes to travel from Chicago to Detroit. A first travel route 425 includes the section 138 having sub-zero ambient temperatures that would significantly affect the performance of a battery in a battery-operated vehicle. The distance from Chicago to Detroit via the first travel route 425 is roughly 282 miles. As an alternative, a second travel route 415 from Chicago to Detroit (via Toledo) is roughly about 308 miles.

The vehicle deployment optimizer module 235 may be executed by the processor 231 (FIG. 2) in an example method for optimizing vehicle deployment in accordance with an embodiment of the disclosure. The environmental factor (in the form of the sub-zero ambient temperatures in section 138) is identified. An energy storage depletion characteristic of a battery of the battery-operated vehicle is evaluated based on the sub-zero ambient temperatures associated with the section 138. In one case, the energy storage depletion characteristic of the battery (and/or other factors) may be found unsuitable for deploying the battery-operated vehicle on the first travel route 425 via the section 138. In another case, where an electric vehicle is being evaluated for deployment, there may be an inadequate number of charging stations available in some portions, or all, of the first travel route 425. In either case, one of various options may be applied.

The first option is to modify a path of travel of the battery-operated vehicle. The modification may involve leaving the first travel route 425 at a location 405, before reaching the section 138, and traveling south along a travel route 410 before traveling eastwards on the second travel route 415.

A second option is to deploy the battery-operated vehicle for a portion of the first travel route 425 that excludes travel through the section 138. For example, the battery-operated vehicle may be used up to the location 405 and the remainder of the trip is conducted using a different vehicle. The battery-operated vehicle that is stopped at the location 405 may be deployed for another delivery from the location 405.

A third option is to cancel deployment of the battery-operated vehicle for the entirety of the trip from Chicago to Detroit and instead deploy a diesel powered or gasoline powered vehicle. However, in some cases, an emissions-free zone may be present in a town or city, on the second travel route 415 for example. If so, a hybrid-electric vehicle may be deployed and care taken to prevent the gasoline engine of the hybrid-electric vehicle from being operated inside the emissions-free zone. Alternatively, an electric vehicle having a more suitable battery may be deployed on the second travel route 415.

In another example method for optimizing vehicle deployment in accordance with an embodiment of the disclosure, a travel route can include multiple segments that may be determined on the basis of various factors such as, for example, delivery times, driving experience of a driver, personal preferences of a driver, and personal constraints of a driver. Accordingly, in one example method for optimizing vehicle deployment, the travel route from Chicago to Detroit can be optimized on the basis of a first delivery being made at Battle Creek by 9 PM on a first day, and a second delivery being made in a small town located north of Battle Creek, by 11 AM the following day. The delivery vehicle that is selected in this case may be a battery-operated vehicle that can be driven from Chicago to Battle Creek without recharging. A driver is instructed to use the battery-operated vehicle for making the delivery at Battle Creek before 9 PM, and is further instructed to halt overnight at Battle Creek after making the delivery. The driver may charge the battery of the battery-operated vehicle when halted overnight at Battle Creek before driving the next morning to the small town that is located off Highway 69, for example. After making the delivery in that town, the driver may travel south along Highway 123, rejoin the travel route 425 (Highway 94), and proceed towards Detroit.

As far as factors such as driving experience of a driver, personal preferences of a driver, and personal constraints of a driver are concerned, in one example method for optimizing vehicle deployment, a driver of a delivery truck may lack experience driving on icy roads. Consequently, optimizing vehicle deployment can involve re-routing a delivery vehicle along an alternative route in one or more segments of the travel route from Chicago to Detroit so as to avoid icy roads. A delivery vehicle that is selected in this case, may be a battery-operated vehicle that can accommodate an additional driving distance as a result of the re-routing.

In another example where one or more delivery vehicles are selected based on personal preferences and/or personal constraints of a driver, a driver may be assigned a two-segment travel route that extends from Chicago to Toledo via Detroit. The driver may complete a first segment of the travel route from Chicago to Detroit based on a first set of timing assignments, before handing over the delivery vehicle to a different driver in Detroit. A second delivery vehicle may then be assigned to the driver for completing a second segment of his/her travel route the following day, from Detroit to Toledo, which may be the home town of the driver. In one example scenario, the second delivery vehicle is a battery-operated vehicle that can be driven from Detroit to Toledo without recharging on the way. In another example scenario, the second vehicle is a hybrid electric vehicle or a gasoline powered vehicle that is selected in place of a battery-operated vehicle because of other reasons.

The two-segment travel path described above can be extended to more than two segments, and vehicle deployment can be optimized by the use of various types of vehicles. Thus, for example, a battery-operated vehicle may be used on a first segment, a hybrid electric vehicle used on a second segment, a gasoline powered vehicle used on a third segment, and so on.

In another example method for optimizing vehicle deployment in accordance with an embodiment of the disclosure, a travel route can be determined based on the availability of trips from future locations (end of route locations) and vehicle (e.g., truck) capability. From this, multiple routes or trips can be scheduled in advance, one after another, for the same vehicle based on the trip requirements and capability of the vehicle. For example, if there are four trips available, trip A from Detroit to Chicago, trip B from Chicago to Nashville, trip C from Nashville to Naples, trip D from Naples to Detroit, these trips can be scheduled subsequently so that a specific truck now has 4 routes to run before it returns home. In some instances, this trip may be unattractive from an electric truck due to the number of miles for the trip and hence the selected vehicle would likely be diesel or diesel hybrid.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and memory, as discussed herein. An implementation of the devices, systems, and methods disclosed herein may communicate over a computer network. A "network" and a "bus" is defined as one or more data links that enable the transport of electronic data between computer systems and/or modules and/or other electronic devices. When information is transferred or provided over a network, a bus, or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced using various devices including personal computers, desktop computers, laptop computers, message processors, handheld devices, multi-processor systems, microprocessor-based or programmable consumer electronics, mobile telephones, PDAs, tablets, pagers, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

A memory such as the memory 233 described herein, can include any one memory element or a combination of volatile memory elements (e.g., random access memory (RAM, such as DRAM. SRAM, SDRAM, etc.)) and non-volatile memory elements (e.g., ROM, hard drive, tape, CD ROM, etc.). Moreover, the memory device may incorporate electronic, magnetic, optical, and/or other types of storage media. In the context of this document, a "non-transitory computer-readable medium" can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

In the context of software, the operations described herein with respect to computers, such as the computer 110, may be implemented by computer-executable instructions stored on one or more non-transitory computer-readable media such as the memory 233, that, when executed by one or more processors such as the processor 231, perform the recited operations. Generally, computer-executable instructions include routines, programs, objects, components, data structures, and the like that perform particular functions or implement particular abstract data types.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   determining an environmental factor associated with a first travel route, wherein the environmental factor comprises an ambient temperature;
   determining an energy storage depletion characteristic of a battery of an electric vehicle or a hybrid electric vehicle based on the environmental factor;
   determining a battery capacity of the electric vehicle or the hybrid electric vehicle;
   determining a maintenance cost of the electric vehicle or the hybrid electric vehicle based on the environmental factor;
   determining one of a gross combined weight rating (GCWR) or a gross vehicle weight rating (GVWR) of the electric vehicle or the hybrid electric vehicle;
   determining a risk adjusted payment by adjusting a base payment associated with operating the electric vehicle or the hybrid electric vehicle along the first travel route responsive to at least one of a tardiness of the operation or a damage event during the operation;
   determining an optimized deployment of the electric vehicle or the hybrid electric vehicle along the first travel route based in part on the energy storage depletion characteristic of the battery, the battery capacity, the maintenance cost of the electric vehicle or the hybrid electric vehicle, the GCWR and/or the GVWR of the electric vehicle or the hybrid electric vehicle, the risk adjusted payment, and an availability of a charging station associated with a charging price along the first travel route, wherein the optimized deployment is associated with a timing constraint and a cost constraint;
   deploying, based on the optimized deployment, the electric vehicle or the hybrid electric vehicle on the first travel route; and
   operating the electric vehicle or the hybrid electric vehicle along the first travel route responsive to the optimized deployment of the electric vehicle or the hybrid electric vehicle on the first travel route.

2. The method of claim 1, further comprising:
determining a location of an emissions-free zone along the first travel route; and
deploying the electric vehicle or the hybrid electric vehicle on the first travel route further based on the location of the emissions-free zone along the first travel route.

3. A device comprising:
a memory that stores computer-executable instructions; and
a processor configured to access the memory and execute the computer-executable instructions to at least:
receive information associated with a first travel route;
determine, based on the information, an environmental factor associated with the first travel route, wherein the environmental factor comprises an ambient temperature;
determine, based on the environmental factor, an energy storage depletion characteristic of a battery of one of an electric vehicle or a hybrid electric vehicle;
determine a battery capacity of the one of the electric vehicle or the hybrid electric vehicle;
determine, based on the environmental factor, a maintenance cost of the one of the electric vehicle or the hybrid electric vehicle;
determine one of a gross combined weight rating (GCWR) or a gross vehicle weight rating (GVWR) of the one of the electric vehicle or the hybrid electric vehicle;
determine a risk adjusted payment by adjusting a base payment associated with operating the one of the electric vehicle or the hybrid electric vehicle along the first travel route responsive to at least one of a tardiness of the operation or a damage event during the operation;
determine, based in part on the energy storage depletion characteristic of the battery, the battery capacity, the maintenance cost of the one of the electric vehicle or the hybrid electric vehicle, the GCWR and/or the GVWR of the one of the electric vehicle or the hybrid electric vehicle, the risk adjusted payment, and an availability of a charging station associated with a charging price along the first travel route, an optimized deployment of the one of the electric vehicle or the hybrid electric vehicle along the first travel route, wherein the optimized deployment is associated with a timing constraint and a cost constraint;
deploy, based on the optimized deployment, the one of the electric vehicle or the hybrid electric vehicle on the first travel route; and
operate the one of the electric vehicle or the hybrid electric vehicle along the first travel route responsive to the optimized deployment of the one of the electric vehicle or the hybrid electric vehicle on the first travel route.

4. The device of claim 3, wherein the processor is further configured to access the memory and execute additional computer-executable instructions to at least:
determine a location of an emissions-free zone along the first travel route; and
deploy the one of the electric vehicle or the hybrid electric vehicle on the first travel route based on the location of the emissions-free zone along the first travel route.

* * * * *